United States Patent
Toyama

(10) Patent No.: US 10,794,781 B2
(45) Date of Patent: Oct. 6, 2020

(54) SENSOR DEVICE

(71) Applicant: JTEKT CORPORATION, Osaka-shi, Osaka (JP)

(72) Inventor: Yuichi Toyama, Owariasahi (JP)

(73) Assignee: JTEKT CORPORATION, Osaka-shi (JP)

( * ) Notice: Subject to any disclaimer, the term of this patent is extended or adjusted under 35 U.S.C. 154(b) by 31 days.

(21) Appl. No.: 16/152,532

(22) Filed: Oct. 5, 2018

(65) Prior Publication Data

US 2019/0113404 A1 Apr. 18, 2019

(30) Foreign Application Priority Data

Oct. 13, 2017 (JP) ................. 2017-199463

(51) Int. Cl.
*G01L 3/10* (2006.01)
(52) U.S. Cl.
CPC .................. *G01L 3/104* (2013.01)
(58) Field of Classification Search
CPC ........... G01L 3/104; G01L 3/101; G01B 7/30; B62D 6/10; G01D 5/145
USPC ...................... 73/862.331–862.338
See application file for complete search history.

(56) References Cited

U.S. PATENT DOCUMENTS

| 7,406,884 | B2 * | 8/2008 | Jerems | ................... | G01L 3/101 |
| | | | | | 73/862.331 |
| 9,500,543 | B2 * | 11/2016 | Lee | ......................... | G01B 7/30 |
| 2007/0157740 | A1 | 7/2007 | Jerems et al. | | |
| 2010/0194385 | A1 | 8/2010 | Ronnat et al. | | |
| 2013/0249538 | A1 | 9/2013 | Oike et al. | | |
| 2013/0305843 | A1 | 11/2013 | Lee et al. | | |
| 2016/0214648 | A1 * | 7/2016 | Schoepe | ............ | B62D 15/0215 |
| 2016/0325781 | A1 | 11/2016 | Choi | | |

(Continued)

FOREIGN PATENT DOCUMENTS

| DE | 10 2010 033769 A1 | 2/2012 |
| DE | 102012024382 A1 | 6/2014 |

(Continued)

OTHER PUBLICATIONS

Mar. 8, 2019 Extended European Search Report issued in European Patent Application No. 18199535.8.

*Primary Examiner* — Octavia Hollington
(74) *Attorney, Agent, or Firm* — Oliff PLC

(57) ABSTRACT

A sensor device where the number of components and mounting steps can be reduced and mountability on a mounting target is improved. A sensor device configured to detect a torque applied to a pinion shaft and pinion shaft's rotation angle. The pinion shaft is formed by coupling an input shaft and output shaft together by a torsion bar. The sensor device includes a torque detecting portion wherein magnetic fields detected by torque detection magnetic sensors change based on the torsion bar's twisting amount, a rotation angle detecting portion wherein magnetic fields detected by rotation angle detection magnetic sensors change based on the pinion shaft's rotation angle, a housing that houses the torque detecting portion and the rotation angle detecting portion, and a circuit board held by the housing. Both the torque detection magnetic sensors and the rotation angle detection magnetic sensors are mounted on the circuit board.

3 Claims, 6 Drawing Sheets

(56) References Cited

U.S. PATENT DOCUMENTS

2016/0379754 A1* 12/2016 Rachui .................. C21D 6/008
                                                              73/862.333

FOREIGN PATENT DOCUMENTS

| EP | 2664906 A2 | 11/2013 |
|----|------------|---------|
| JP | 2013-92461 A | 5/2013 |

* cited by examiner

US 10,794,781 B2

SENSOR DEVICE

INCORPORATION BY REFERENCE

The disclosure of Japanese Patent Application No. 2017-199463 filed on Oct. 13, 2017 including the specification, drawings and abstract, is incorporated herein by reference in its entirety.

BACKGROUND OF THE INVENTION

1. Field of the Invention

The present invention relates to a sensor device whose detection target is a shaft formed by coupling a pair of rotation shaft members together by a flexible torsion shaft, and which is configured to detect a torque applied to the shaft and a rotation angle of the shaft.

2. Description of the Related Art

Hitherto, a sensor device configured to detect a torque and a rotation angle of a shaft formed by coupling a pair of rotation shaft members together by a flexible torsion shaft is used in, for example, a steering system of a vehicle (see, for example, Japanese Patent Application Publication No. 2013-92461 (JP 2013-92461 A)).

In the steering system described in JP 2013-92461 A, a column shaft is inserted through a tubular case member serving as a support, and a rotation angle and a steering torque of the column shaft along with a steering operation of a steering wheel are detected by the sensor device. The column shaft is formed by coupling an input shaft and a lower shaft together by a torsion bar. The steering system includes an electric motor, a gear mechanism, and a control device. The gear mechanism transmits, to the lower shaft, a torque of the electric motor that is obtained through speed reduction. The control device controls the electric motor based on a detection result from the sensor device.

The sensor device includes a rotation angle sensor and a torque sensor. The rotation angle sensor detects the rotation angle of the column shaft. The torque sensor detects the steering torque. The column shaft is arranged between the rotation angle sensor and the torque sensor.

The torque sensor includes a magnetic sensor, a cylindrical magnet, first and second yokes, and first and second magnetic flux collecting rings. The cylindrical magnet is attached to the outer peripheral surface of the input shaft. The first and second yokes are arranged so as to surround the cylindrical magnet. The first and second magnetic flux collecting rings guide, to the magnetic sensor, magnetic fields generated in the first and second yokes. The first and second yokes are molded in a first holding member, and rotate together with the lower shaft. The first and second magnetic flux collecting rings are molded in a second holding member together with the magnetic sensor, and are fixed to the case member.

The rotation angle sensor includes a detection gear, a subsidiary gear, a first magnetic sensor, a second magnetic sensor, and a circuit board. The detection gear rotates by meshing with external teeth formed on the first holding member. The subsidiary gear rotates by meshing with the detection gear. The first magnetic sensor detects a magnetic field of a first magnet fixed to the detection gear. The second magnetic sensor detects a magnetic field of a second magnet fixed to the subsidiary gear. The first magnetic sensor and the second magnetic sensor are mounted on the circuit board.

In the sensor device formed as described above, it is necessary to attach the torque sensor and the rotation angle sensor to the case member, and also route wiring in association with the respective sensors. Therefore, it is difficult to reduce the number of components and the number of mounting steps. The torque sensor and the rotation angle sensor protrude in a radial direction of the column shaft. Therefore, it may be difficult to secure a mounting space while avoiding interference with other on-board devices or the like.

SUMMARY OF THE INVENTION

It is one object of the present invention to provide a sensor device in which the number of components and the number of mounting steps can be reduced, whereby the cost can be reduced. It is another object of the present invention to provide a sensor device in which the mountability on a mounting target such as a vehicle is improved.

One aspect of the present invention relates to a sensor device whose detection target is a shaft rotatably supported on a support and formed by coupling a pair of rotation shaft members together by a flexible torsion shaft, and which is configured to detect a torque applied to the shaft and a rotation angle of the shaft with respect to the support.

The sensor device includes a torque detecting portion, a rotation angle detecting portion, a housing, and a circuit board. The torque detecting portion includes a pair of soft magnetic bodies, a torque detection permanent magnet, and a torque detection magnetic sensor. The pair of soft magnetic bodies have facing portions that face each other along a rotation axis direction of the shaft. The torque detection permanent magnet is configured to generate a magnetic flux in a magnetic path including the pair of soft magnetic bodies. The torque detection magnetic sensor is configured to detect a magnetic field generated between the facing portions. The magnetic field detected by the torque detection magnetic sensor changes based on a twisting amount of the torsion shaft. The rotation angle detecting portion includes a rotating body, a rotation angle detection permanent magnet, and a rotation angle detection magnetic sensor. The rotating body is configured to rotate by meshing with an external gear configured to rotate together with the shaft. The rotation angle detection permanent magnet is fixed to the rotating body. The rotation angle detection magnetic sensor is configured to detect a magnetic field of the rotation angle detection permanent magnet. The magnetic field detected by the rotation angle detection magnetic sensor changes based on the rotation angle of the shaft. The housing houses the torque detecting portion and the rotation angle detecting portion. The circuit board is held by the housing. The torque detection magnetic sensor is mounted on a first mounting portion formed in the circuit board, and the rotation angle detection magnetic sensor is mounted on a second mounting portion formed in the circuit board.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
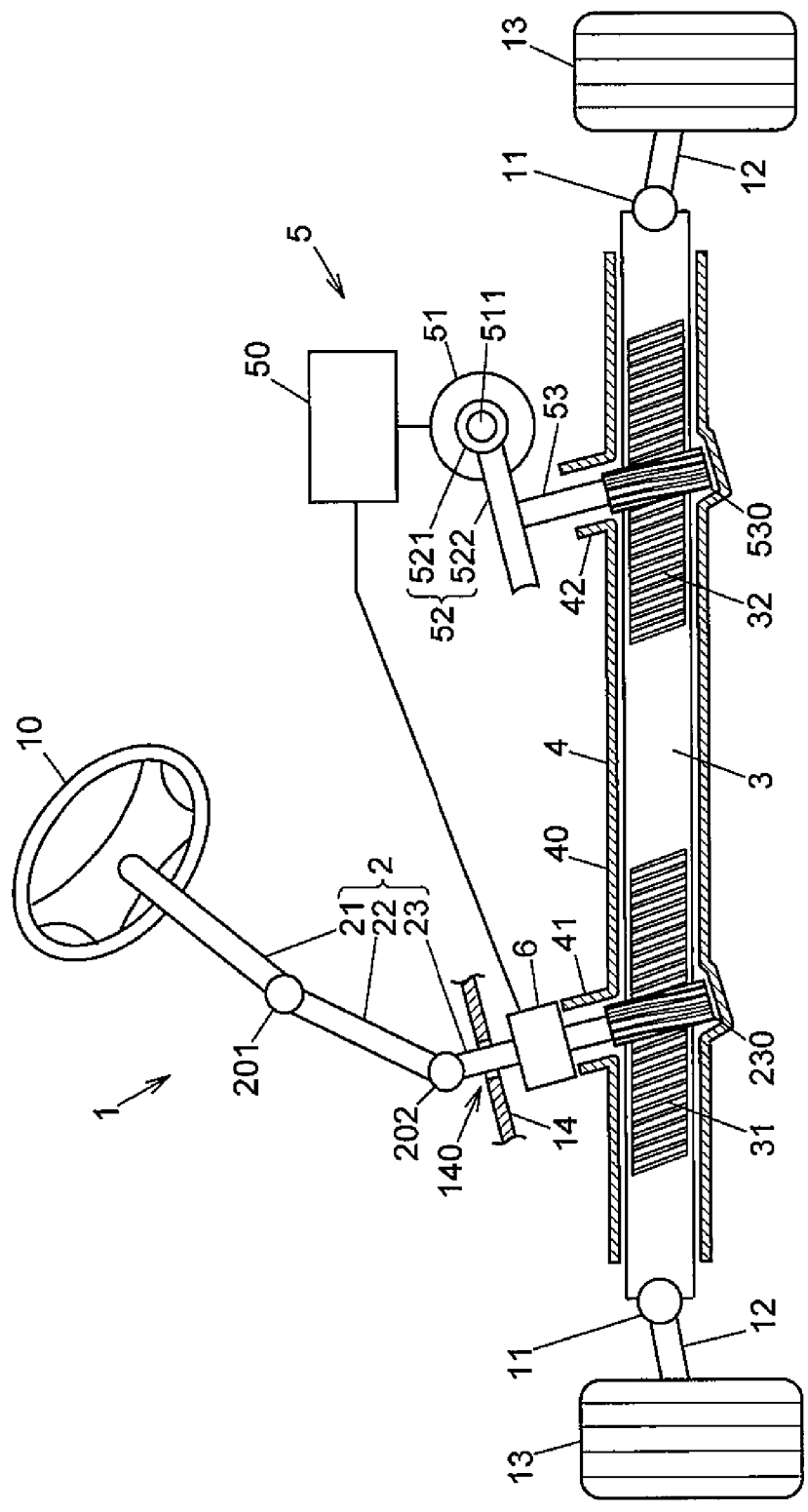
FIG. 1 is a structural view schematically illustrating an example of the structure of a steering system including a sensor device according to an embodiment of the present invention.

An embodiment of the present invention is described below with reference to the drawings. FIG. 1 is a structural view schematically illustrating an example of the structure of a steering system including a sensor device according to the embodiment of the present invention.

A steering system 1 includes a steering wheel 10, a column shaft 21, an intermediate shaft 22, a first pinion shaft 23, a rack shaft 3, a rack housing 4, a steering assist device 5, and a sensor device 6. The steering wheel 10 is operated to rotate by a driver. The steering wheel 10 is fixed to one end of the column shaft 21. The intermediate shaft 22 is coupled to the column shaft 21 via a universal joint 201. The first pinion shaft 23 is coupled to the intermediate shaft 22 via a universal joint 202. The rack shaft 3 serves as a steering operation shaft that meshes with the first pinion shaft 23. The rack housing 4 houses the rack shaft 3, and extends in a vehicle width direction. The steering assist device 5 assists a driver's steering operation. The sensor device 6 detects a steering angle and a steering torque.

For example, the universal joints 201 and 202 are Cardan joints. The column shaft 21, the intermediate shaft 22, and the first pinion shaft 23 constitute a steering shaft 2 configured to transmit, to the rack shaft 3, a steering torque applied to the steering wheel 10. The first pinion shaft 23 is a member corresponding to a shaft of the present invention, which rotates in response to the steering operation of the steering wheel 10. A pinion toothing 230 is formed at one end of the first pinion shaft 23.

The steering assist device 5 includes a controller 50, an electric motor 51, a speed reducing mechanism 52, and a second pinion shaft 53. The electric motor 51 generates a torque based on a motor current output from the controller 50. The speed reducing mechanism 52 reduces the speed of rotation of an output shaft 511 of the electric motor 51. The second pinion shaft 53 is rotated by the torque of the electric motor 51 that is obtained through the speed reduction performed by the speed reducing mechanism 52. The speed reducing mechanism 52 includes a worm 521 and a worm wheel 522. The worm 521 is coupled to the output shaft 511 of the electric motor 51 so as to rotate together with the output shaft 511. The worm wheel 522 meshes with the worm 521. The worm wheel 522 rotates together with the second pinion shaft 53, and applies a steering assist torque to the second pinion shaft 53. A pinion toothing 530 is formed on the second pinion shaft 53. For example, the controller 50 controls the electric motor 51 based on the steering torque applied to the steering wheel 10, the steering angle of the steering wheel 10, and a vehicle speed.

A first rack toothing 31 and a second rack toothing 32 are formed on the rack shaft 3. The first rack toothing 31 meshes with the pinion toothing 230 of the first pinion shaft 23. The second rack toothing 32 meshes with the pinion toothing 530 of the second pinion shaft 53. Ball joint sockets 11 are fixed to both ends of the rack shaft 3. Tie rods 12 are coupled to a pair of right and left front wheels 13 via knuckle arms (not illustrated), respectively. The tie rods 12 are coupled to the ball joint sockets 11, respectively. The rack shaft 3 turns the right and left front wheels 13 that are steered wheels through an advancing or retreating movement in the vehicle width direction.

The rack housing 4 has a body portion 40, a first tubular portion 41, and a second tubular portion 42. The body portion 40 houses the rack shaft 3. The first tubular portion 41 houses a part of the first pinion shaft 23 including the pinion toothing 230. The second tubular portion 42 houses a part of the second pinion shaft 53 including the pinion toothing 530.

The first pinion shaft 23 is inserted through an insertion port 140 provided in a dash panel 14 that demarcates the inside and outside of a vehicle cabin. The sensor device 6 is arranged outside the vehicle cabin below the dash panel 14 in FIG. 1.

Figure 2:
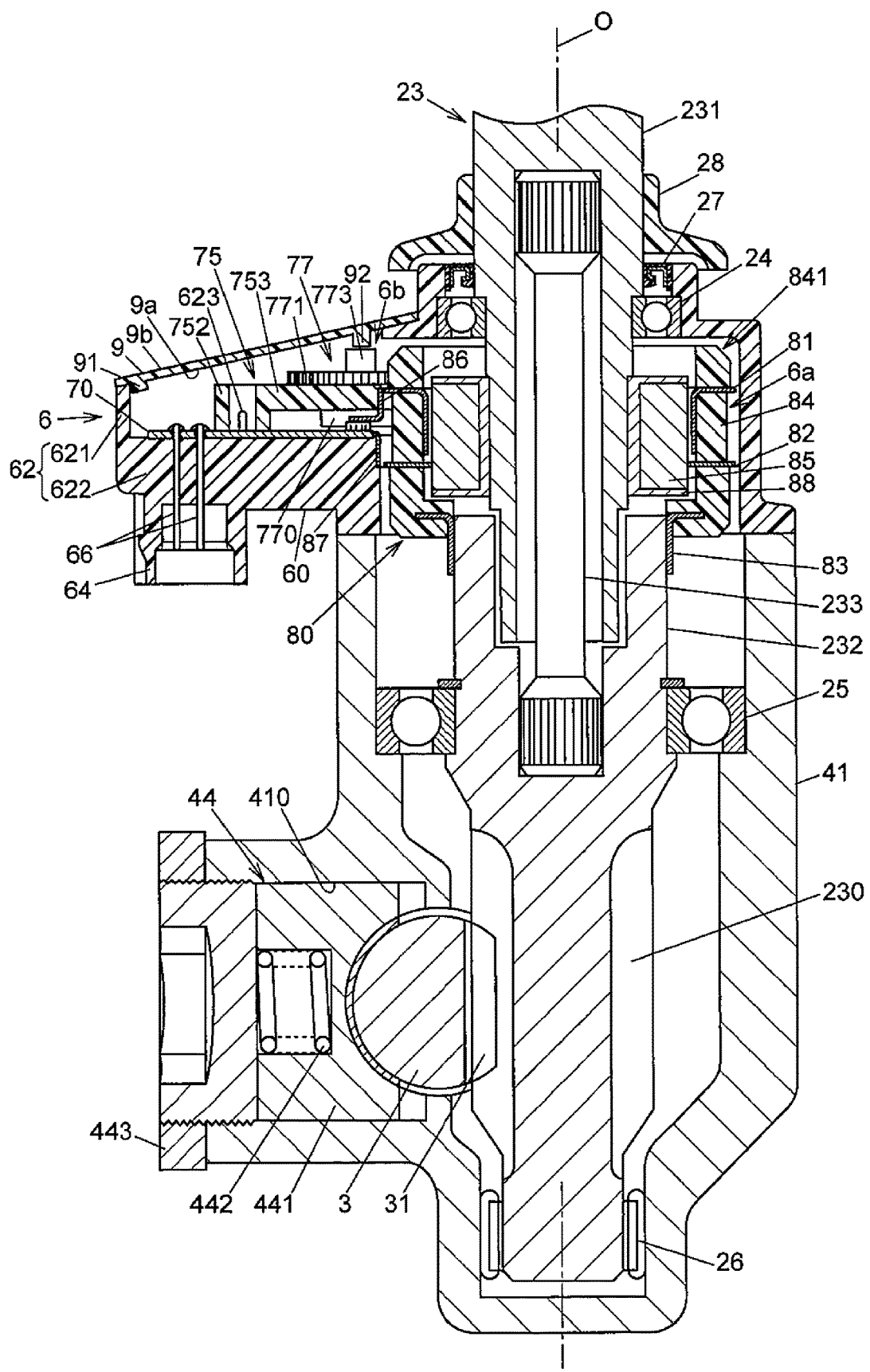
FIG. 2 is a sectional view illustrating the inside of a first tubular portion of a rack housing in a cross section including a rotation axis of a first pinion shaft.

FIG. 2 is a sectional view illustrating the inside of the first tubular portion 41 of the rack housing 4 in a cross section including a rotation axis of the first pinion shaft 23. The first pinion shaft 23 is hereinafter referred to simply as a pinion shaft 23. The pinion shaft 23 is a detection target of the sensor device 6 for a torque and a rotation angle.

The pinion shaft 23 has an input shaft 231 and an output shaft 232. The input shaft 231 is coupled to the second universal joint 202. The output shaft 232 has the pinion toothing 230. The pinion shaft 23 is formed by coupling the input shaft 231 and the output shaft 232 together by a flexible torsion bar (torsion shaft) 233. The torsion bar 233 is twisted by the steering torque, and the input shaft 231 and the output shaft 232 serving as a pair of rotation shaft members rotate relative to each other at an angle corresponding to the twisting amount. A direction parallel to a rotation axis O of the pinion shaft 23 is hereinafter referred to as an axial direction, and a direction perpendicular to the axial direction is hereinafter referred to as a radial direction. One side in the axial direction that corresponds to the top of FIG. 2 is referred to as an upper side, and the other side in the axial direction that corresponds to the bottom of FIG. 2 is referred to as a lower side.

The input shaft 231 is rotatably supported on a housing 60 of the sensor device 6 via a ball bearing 24. The sensor device 6 is fixed to the upper end of the first tubular portion 41. A portion of the output shaft 232 that is located above the pinion toothing 230 is supported by a ball bearing 25. A portion of the output shaft 232 that is located below the pinion toothing 230 is supported by a needle roller bearing 26. The pinion shaft 23 is supported by the ball bearings 24 and 25 and the needle roller bearing 26 so as to be rotatable relative to the rack housing 4 serving as a support. The input shaft 231 is inserted through the housing 60. A seal member 27 is attached to the inner peripheral surface of the housing 60 at its upper end. The seal member 27 is in sliding contact with the outer peripheral surface of the input shaft 231. An umbrella-shaped cover member 28 is attached to the input shaft 231. The cover member 28 covers the upper end of the housing 60.

The rack housing 4 houses a rack guide mechanism 44 configured to elastically press the first rack toothing 31 of the rack shaft 3 against the pinion toothing 230 of the pinion shaft 23. The rack guide mechanism 44 includes a support yoke 441, a coil spring 442, and a plug 443. The support yoke 441 is housed in a housing hole 410 provided in the first tubular portion 41 so as to be movable in advancing and retreating directions. The coil spring 442 urges the support yoke 441 toward the back face of the gear of the rack shaft 3. The plug 443 closes the opening of the housing hole 410.

The sensor device 6 detects a rotation angle of the pinion shaft 23 with respect to the rack housing 4, and also detects a steering torque transmitted between the input shaft 231 and the output shaft 232 based on the twisting amount of the torsion bar 233. In this embodiment, the sensor device 6 detects a rotation angle of the output shaft 232 as the steering angle. Information on the rotation angle detected by the sensor device 6 is used for various types of control for the vehicle. For example, the information on the rotation angle is used for control to prevent a sideslip of a vehicle in a driving stabilization device (stability control system) configured to stabilize driving of the vehicle.

(Structure of Sensor Device 6)

Next, the structure of the sensor device 6 is described in detail with reference to FIG. 2 to FIG. 8. The sensor device 6 includes the housing 60, a single circuit board 70, torque detection magnetic sensors 71 and 72, rotation angle detection magnetic sensors 73 and 74, a retainer 75, a large-diameter gear 76, a small-diameter gear 77, a rotation angle detection first permanent magnet 78 (see FIG. 5), a rotation angle detection second permanent magnet 79, a yoke unit 80, a tubular ring magnet 85, first and second magnetic flux collecting members 86 and 87, and a plate-shaped lid 9. The circuit board 70 is held by the housing 60. The retainer 75 fixes the circuit board 70 to the inside of the housing 60. The large-diameter gear 76 and the small-diameter gear 77 serve as rotating bodies rotatably supported on the retainer 75. The rotation angle detection first permanent magnet 78 is fixed to the large-diameter gear 76. The rotation angle detection second permanent magnet 79 is fixed to the small-diameter gear 77. The yoke unit 80 is formed by integrating first and second yokes 81 and 82 and a fitting ring 83 in a resin portion 84. The ring magnet 85 is fixed to the input shaft 231. The first and second magnetic flux collecting members 86 and 87 are arranged in relation to the first and second yokes 81 and 82, respectively. The lid 9 closes an opening 620 of the housing 60.

Among the components described above, the torque detection magnetic sensors 71 and 72, the ring magnet 85, the first and second yokes 81 and 82, and the first and second magnetic flux collecting members 86 and 87 constitute a torque detecting portion 6a configured to detect a torque applied to the pinion shaft 23 (steering torque). The rotation angle detection magnetic sensors 73 and 74, the large-diameter gear 76, the small-diameter gear 77, and the first and second permanent magnets 78 and 79 constitute a rotation angle detecting portion 6b configured to detect a rotation angle of the pinion shaft 23 (steering angle).

Figure 6:
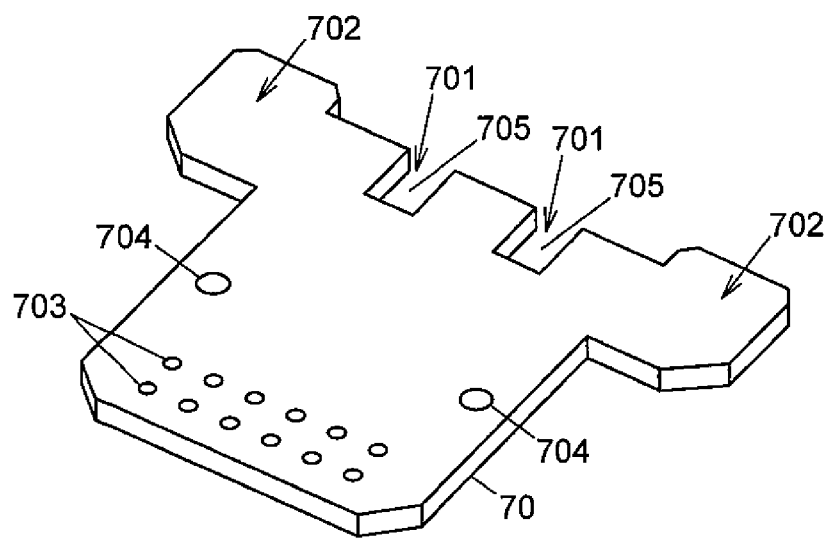
FIG. 6 is a perspective view illustrating a circuit board alone.
Figure 7:
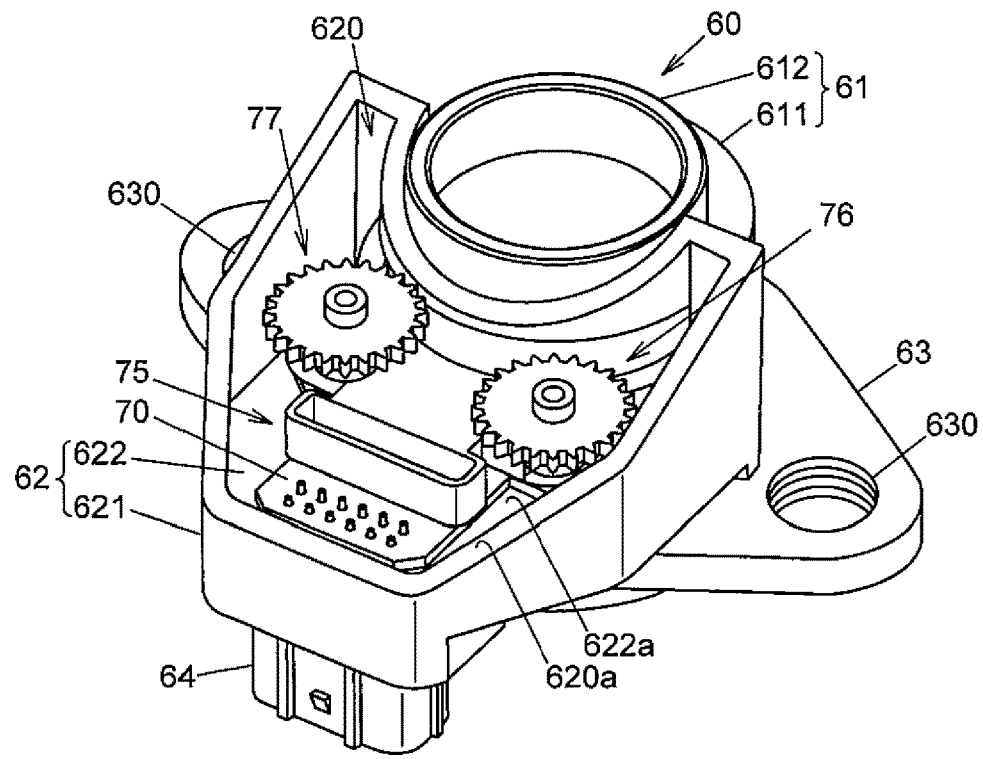
FIG. 7 is a perspective view illustrating the sensor device without a lid.

The magnetic sensors 71 to 74 are mounted on one surface of the circuit board 70. The circuit board 70 and the magnetic sensors 71 to 74 mounted on the circuit board 70 are hereinafter referred to collectively as a sensor board 700. The circuit board 70 is a printed circuit board having a wiring pattern (not illustrated) formed on the surface of a plate-shaped base material formed of an insulator such as glass epoxy. As illustrated in FIG. 6, first mounting portions 701, second mounting portions 702, a plurality of (12 in this embodiment) electrodes 703, and two insertion holes 704 are formed in the circuit board 70. The torque detection magnetic sensors 71 and 72 are mounted on the first mounting portions 701. The rotation angle detection magnetic sensors 73 and 74 are mounted on the second mounting portions 702. The electrodes 703 are formed by through holes passing through the base material. A pair of shaft-shaped protrusions 623 provided on the housing 60 are inserted through the insertion holes 704, respectively.

Cutouts 705 are formed in the first mounting portions 701 of the circuit board 70. Each of the torque detection magnetic sensors 71 and 72 is mounted over the cutout 705. A part of the circuit board 70 where the first mounting portions 701, the electrodes 703, and the insertion holes 704 are formed has a rectangular shape. The second mounting portions 702 are formed at parts that project from the rectangular part. The cutouts 705 are open to one side of the rectangular part that is located on the yoke unit 80 side. Each electrode 703 is connected to a terminal of the torque detection magnetic sensor 71 or 72 or a terminal of the rotation angle detection magnetic sensor 73 or 74 by the wiring pattern.

On the circuit board 70, the two torque detection magnetic sensors 71 and 72 are mounted between the two rotation angle detection magnetic sensors 73 and 74. In this embodiment, the magnetic sensors 71 to 74 are arranged in line along a direction orthogonal to the radial direction of the pinion shaft 23.

The housing 60 is formed of a resin such as nylon 66, and houses the torque detecting portion 6a and the rotation angle detecting portion 6b. A tubular first housing portion 61, a second housing portion 62 having a bottomed frame shape, a flange portion 63, and a connector fitting portion 64 are formed integrally on the housing 60. The first housing portion 61 houses the yoke unit 80, the ring magnet 85, and the first and second magnetic flux collecting members 86 and 87. The second housing portion 62 houses the large-diameter gear 76, the small-diameter gear 77, and the sensor board 700. A plurality of bolt holes 630 for fixing the housing 60 to the first tubular portion 41 of the rack housing 4 are formed in the flange portion 63. A connector (not illustrated) for signal transmission to the controller 50 is fitted to the connector fitting portion 64.

The first housing portion 61 has a large-diameter tubular portion 611 and a small-diameter tubular portion 612. The large-diameter tubular portion 611 houses the yoke unit 80. The input shaft 231 is inserted through the small-diameter tubular portion 612. The large-diameter tubular portion 611 has an opening at a part coupled to the second housing portion 62. The internal space of the first housing portion 61 and the internal space of the second housing portion 62 communicate with each other via the opening.

The second housing portion 62 has a frame 621 and a bottom 622 that closes one side of the frame 621 in the axial direction. The shaft-shaped protrusions 623 are provided upright on a bottom face 622a of the second housing portion 62 at the bottom 622. The shaft-shaped protrusions 623 are inserted through the insertion holes 704 of the circuit board 70, respectively. A non-mounting surface of the circuit board 70, which is opposite to the mounting surface where the magnetic sensors 71 to 74 are mounted, faces the bottom face 622a.

The opening 620 is formed at the end of the frame 621 that is opposite to the bottom 622. The opening 620 has a size that allows the sensor board 700 to be introduced into the second housing portion 62. The end face of the frame 621 is an open end face 620a of the opening 620. The open end face 620a is an inclined flat face that is inclined with respect to the axial direction and the radial direction.

The second magnetic flux collecting member 87 and a plurality of connection terminals 66 are fixed to the housing 60. The connection terminals 66 are electrically connected to the electrodes 703 of the circuit board 70, respectively. The connection terminal 66 has a bar shape passing through the bottom 622 in the axial direction. One end of the connection terminal 66 protrudes into the frame 621, and the other end of the connection terminal 66 protrudes into the connector fitting portion 64. The one end of the connection terminal 66 that protrudes into the frame 621 is inserted through the electrode 703 of the circuit board 70, and is electrically connected to the electrode 703 by soldering. The housing 60 is formed of a thermoplastic resin such as nylon 66, and the connection terminals 66 and the second magnetic flux collecting member 87 are molded in the housing 60 by insert molding.

The retainer 75 integrally has an arc portion 751, a holding portion 752, and a support portion 753. The arc portion 751 extends along a circumferential direction of the pinion shaft 23. The holding portion 752 holds the circuit board 70. The support portion 753 is provided between the arc portion 751 and the holding portion 752, and support holes 753a and 753b are formed in the support portion 753. The support holes 753a and 753b rotatably support the large-diameter gear 76 and the small-diameter gear 77, respectively. Both ends 751a and 751b of the arc portion 751 are fixed to the bottom face 622a of the bottom 622 by, for example, bonding. The holding portion 752 abuts against the mounting surface of the circuit board 70.

The first magnetic flux collecting member 86 is fixed to the arc portion 751 of the retainer 75. The retainer 75 is formed of a thermoplastic resin such as nylon 66, and the first magnetic flux collecting member 86 is molded in the retainer 75 by insert molding. The support portion 753 has a flat-plate shape. The support holes 753a and 753b that support the large-diameter gear 76 and the small-diameter gear 77, respectively, pass through the support portion 753 in the axial direction.

The large-diameter gear 76 integrally has a gear portion 761, a cylindrical boss portion 762 (see FIG. 5), and a shaft portion 763. The gear portion 761 is formed of a spur gear having a plurality of gear teeth formed on its outer peripheral edge. The boss portion 762 protrudes to one side in a rotation axis direction from a central part of the gear portion 761. The shaft portion 763 protrudes to the other side in the rotation axis direction from the central part of the gear portion 761. The first permanent magnet 78 is fixed to an inner side of the boss portion 762. A tubular magnetic shield ring 760 is fitted to the outer peripheral surface of the boss portion 762. The magnetic shield ring 760 prevents interference of a magnetic field.

Similarly, the small-diameter gear 77 integrally has a gear portion 771, a cylindrical boss portion 772, and a shaft portion 773. The gear portion 771 is formed of a spur gear having a plurality of gear teeth formed on its outer peripheral edge. The boss portion 772 protrudes to the one side in a rotation axis direction from a central part of the gear portion 771. The shaft portion 773 protrudes to the other side in the rotation axis direction from the central part of the gear portion 771. The second permanent magnet 79 is fixed to an inner side of the boss portion 772. A tubular magnetic shield ring 770 is fitted to the outer peripheral surface of the boss portion 772. The magnetic shield ring 770 prevents interference of a magnetic field.

Each of the large-diameter gear 76 and the small-diameter gear 77 is formed of a resin, and each of the magnetic shield rings 760 and 770 is formed of a soft magnetic material such as iron. The large-diameter gear 76 and the small-diameter gear 77 are different from each other in terms of the numbers of teeth of the gear portions 761 and 771. The number of teeth of the large-diameter gear 76 is larger than the number of teeth of the small-diameter gear 77. In this embodiment, the number of teeth of the large-diameter gear 76 is 26, and the number of teeth of the small-diameter gear 77 is 24.

The large-diameter gear 76 is arranged so that the boss portion 762 is located on the bottom 622 side of the housing 60 and the shaft portion 763 is located on the opening 620 side. The boss portion 762 and the magnetic shield ring 760 of the large-diameter gear 76 are loosely fitted to the support hole 753a of the support portion 753 of the retainer 75, and partially protrude toward the circuit board 70 with respect to the support portion 753. A part of the rotation angle detection magnetic sensor 73 is arranged on the inner side of the boss portion 762 and the magnetic shield ring 760 to detect a magnetic field of the first permanent magnet 78.

Similarly, the small-diameter gear 77 is arranged so that the boss portion 772 is located on the bottom 622 side of the housing 60 and the shaft portion 773 is located on the opening 620 side. The boss portion 772 and the magnetic shield ring 770 of the small-diameter gear 77 are loosely fitted to the support hole 753b of the support portion 753 of the retainer 75, and partially protrude toward the circuit board 70 with respect to the support portion 753. A part of the rotation angle detection magnetic sensor 74 is arranged on the inner side of the boss portion 772 and the magnetic shield ring 770 to detect a magnetic field of the second permanent magnet 79.

Each of the first and second permanent magnets 78 and 79 has a pair of magnetic poles (N pole and S pole). The magnetic fields detected by the rotation angle detection magnetic sensors 73 and 74 change based on the rotation angle of the pinion shaft 23. More specifically, the rotation angle detection magnetic sensors 73 and 74 output signals having sinusoidal waveforms in periods based on the rotation speeds of the large-diameter gear 76 and the small-diameter gear 77. Even if the steering wheel 10 is steered up to a maximum steering angle to the right or left and the pinion shaft 23 is rotated a plurality of times, the phases of the signals output from the magnetic sensors 73 and 74 are not synchronized because of the difference between the numbers of teeth of the large-diameter gear 76 and the small-diameter gear 77. Thus, the controller 50 can detect the absolute value of the rotation angle of the pinion shaft 23 based on the signals output from the magnetic sensors 73 and 74.

In the yoke unit 80, the first and second yokes 81 and 82 and the fitting ring 83 are integrated in the resin portion 84 by insert molding. The upper end of the output shaft 232 is press-fitted to the fitting ring 83. The yoke unit 80 rotates together with the output shaft 232. The first and second yokes 81 and 82 are arranged on an outer side of the ring magnet 85 with a predetermined clearance from the outer peripheral surface of the ring magnet 85. An external gear 841 is formed at one end of the resin portion 84 in the axial direction. The gear portions 761 and 771 of the large-diameter gear 76 and the small-diameter gear 77 mesh with the external gear 841, and the large-diameter gear 76 and the small-diameter gear 77 rotate at different speeds along with the rotation of the pinion shaft 23.

Figure 4:
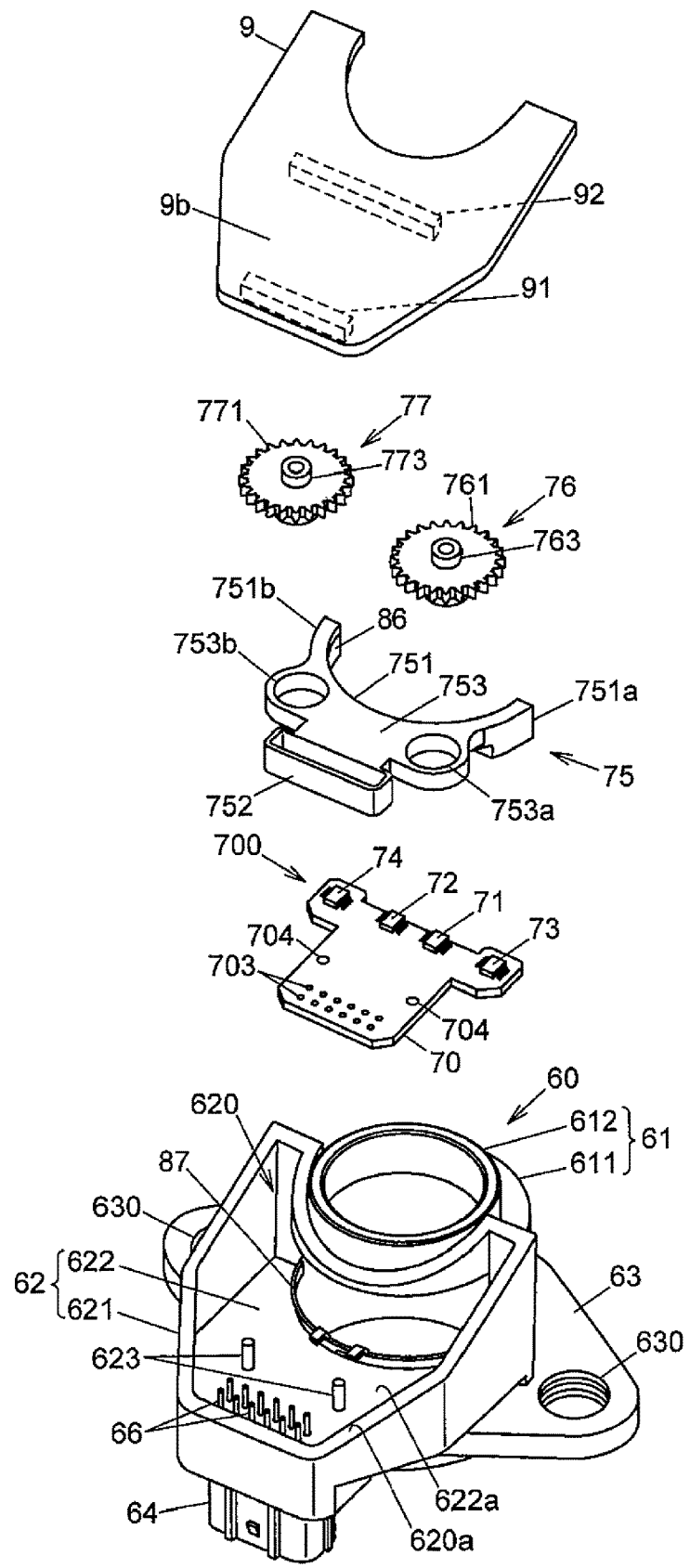
FIG. 4 is an exploded perspective view of the sensor device.
Figure 5:
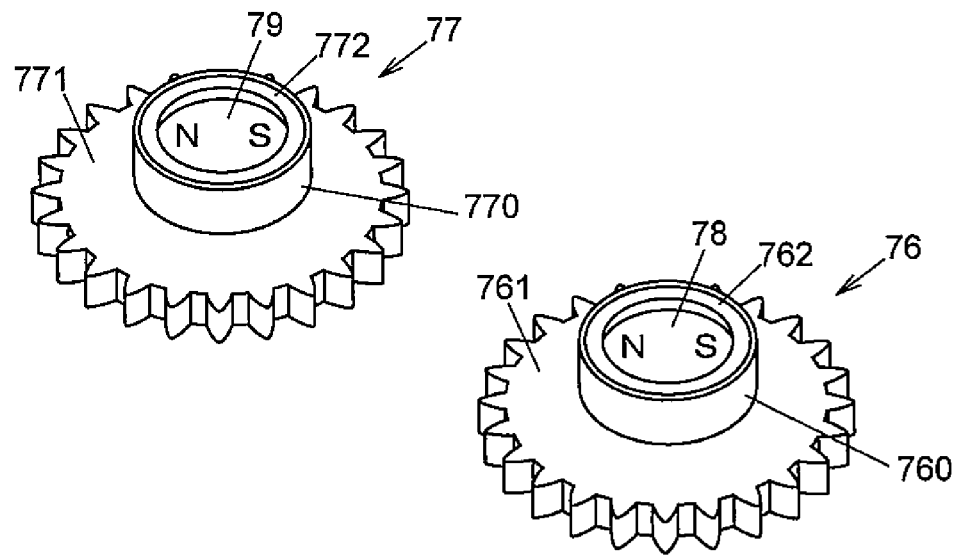
FIG. 5 is a perspective view illustrating a back side of a large-diameter gear and a small-diameter gear.

The opening 620 is sealed with the lid 9 in a liquid-tight manner after the sensor board 700, the retainer 75, the large-diameter gear 76, and the small-diameter gear 77 are mounted on the housing 60. The lid 9 is formed of a resin having a flat-plate shape such as nylon 66, and is joined to the open end face 620a of the opening 620 by, for example, laser welding, ultrasonic welding, or bonding. As illustrated in FIG. 2 and FIG. 4, the lid 9 is provided with an engagement protrusion 91 and a retaining protrusion 92 on an inner face 9a that faces the circuit board 70. The engagement protrusion 91 engages with an inner side of the frame 621 of the housing 60. The retaining protrusion 92 faces the shaft portions 763 and 773 of the large-diameter gear 76 and the small-diameter gear 77 to retain the large-diameter gear 76 and the small-diameter gear 77 on the retainer 75.

As described above, the open end face 620a of the opening 620 is the inclined flat face, and therefore an outer face 9b of the lid 9 attached to the open end face 620a is inclined with respect to the axial direction. In a state in which the steering system 1 is mounted on the vehicle, the inclination angle of the outer face 9b of the lid 9 with respect to a vertical direction of the vehicle increases. For example, if the vehicle is traveling in the rain and water droplets splashed by the front wheel 13 adhere to the outer face 9b of the lid 9, the water droplets easily run down by the gravity. Thus, the waterproof property of the sensor device 6 is enhanced.

Figure 3:
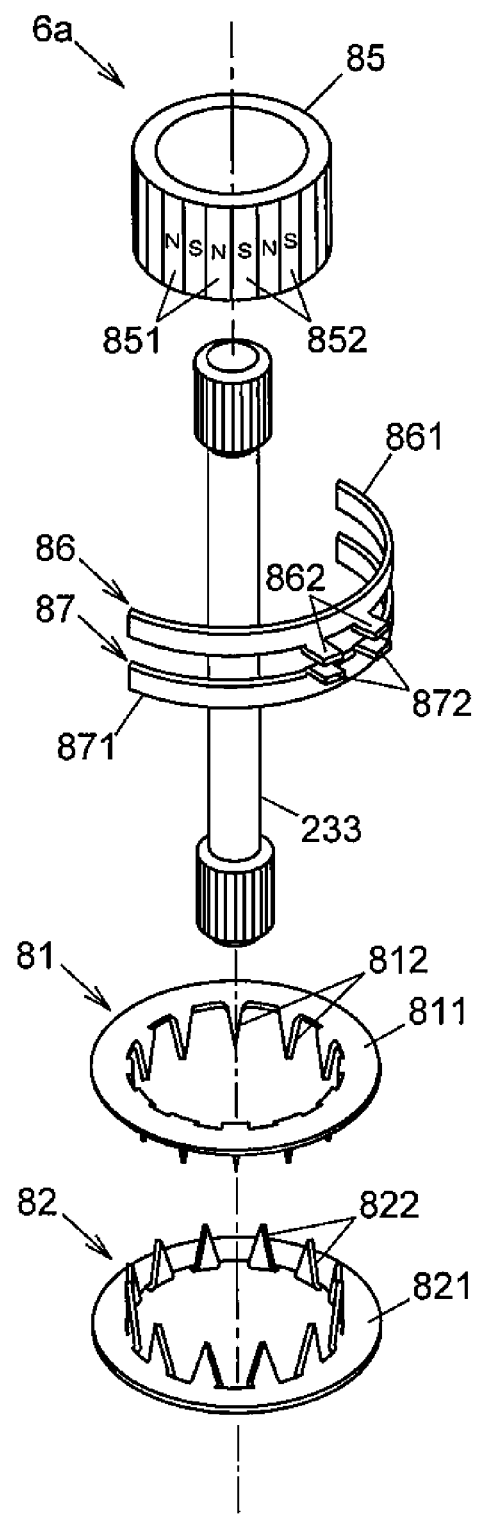
FIG. 3 is an exploded perspective view illustrating components of a torque detecting portion.

Next, the structure of the torque detecting portion 6a is described with reference to FIG. 3. The ring magnet 85 is a torque detection multipole permanent magnet in which a plurality of N poles 851 and a plurality of S poles 852 are alternately arranged along a circumferential direction. The ring magnet 85 is fixed to the outer peripheral surface of the input shaft 231 via a fixing member 88, and rotates together with the input shaft 231.

The first yoke 81 has a surrounding portion 811 having a ring-plate shape and a plurality of triangular claw portions 812. The surrounding portion 811 surrounds the ring magnet 85. The claw portions 812 are bent from the inner peripheral edge of the surrounding portion 811 to protrude in the axial direction. The second yoke 82 has a surrounding portion 821 having a ring-plate shape and a plurality of triangular claw portions 822. The surrounding portion 821 surrounds the ring magnet 85 at a position spaced away from the first yoke 81 in the axial direction. The claw portions 822 are bent from the inner peripheral edge of the surrounding portion 821 to protrude in the axial direction. The total of the numbers of the claw portions 812 and 822 of the first and second yokes 81 and 82 is equal to the number of magnetic poles of the ring magnet 85. In the example illustrated in FIG. 3, each of the numbers of the claw portions 812 and 822 is 12, and each of the numbers of the N poles 851 and the S poles 852 is also 12.

Figure 8:
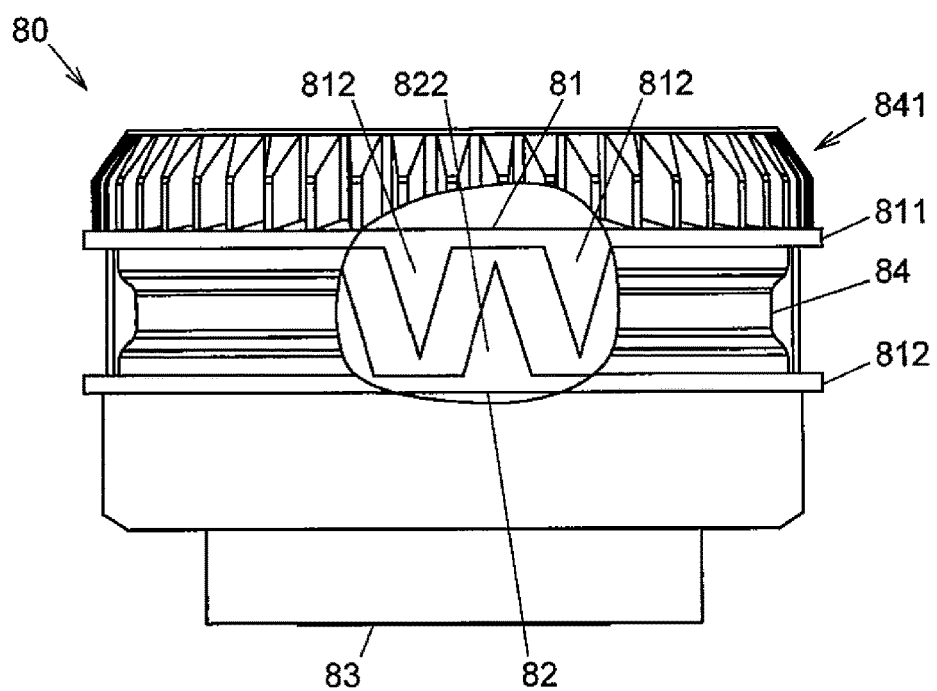
FIG. 8 is a partially cutaway side view illustrating a yoke unit.

Each of the surrounding portions 811 and 821 of the first and second yokes 81 and 82 has a flat-plate shape perpendicular to the axial direction. As illustrated in FIG. 8, the claw portions 812 of the first yoke 81 and the claw portions 822 of the second yoke 82 are alternately arranged with predetermined distances therebetween in the circumferential direction, and face the outer peripheral surface of the ring magnet 85. The surrounding portion 811 of the first yoke 81 and the surrounding portion 821 of the second yoke 82 are arranged in parallel to each other with a predetermined distance therebetween in the axial direction, and the outer peripheral edge of each of the surrounding portions 811 and 821 protrudes from the outer peripheral surface of the resin portion 84 of the yoke unit 80. FIG. 8 illustrates the inner peripheral surface of the yoke unit 80 at a cutaway part.

The first magnetic flux collecting member 86 has an arc-shaped magnetic flux collecting portion 861 and a pair of tongue portions 862. The magnetic flux collecting portion 861 is arranged on the outer periphery of the surrounding portion 811 of the first yoke 81. The tongue portions 862 protrude radially outward from the magnetic flux collecting portion 861. The second magnetic flux collecting member 87 has an arc-shaped magnetic flux collecting portion 871 and a pair of tongue portions 872. The magnetic flux collecting portion 871 is arranged on the outer periphery of the surrounding portion 821 of the second yoke 82. The tongue portions 872 protrude radially outward from the magnetic flux collecting portion 871. The tongue portions 872 of the second magnetic flux collecting member 87 are arranged in the cutouts 705 of the circuit board 70, respectively. In this embodiment, each of the magnetic flux collecting portions 861 and 871 has a semicircular shape, but may be formed into an annular shape.

The ring magnet 85 generates a magnetic flux in a magnetic path including the first and second yokes 81 and 82 and the first and second magnetic flux collecting members 86 and 87. The first and second magnetic flux collecting members 86 and 87 are examples of a pair of soft magnetic bodies of the present invention, and the tongue portions 862 of the first magnetic flux collecting member 86 and the tongue portions 872 of the second magnetic flux collecting member 87 are examples of facing portions of the present invention, which face each other in the axial direction.

The magnetic flux of the first yoke 81 is collected in the tongue portions 862 by the first magnetic flux collecting member 86. The magnetic flux of the second yoke 82 is collected in the tongue portions 872 by the second magnetic flux collecting member 87. The torque detection magnetic sensors 71 and 72 are arranged between the tongue portions 862 of the first magnetic flux collecting member 86 and the tongue portions 872 of the second magnetic flux collecting member 87, respectively, and detect the intensity of a magnetic field generated between the tongue portions 862 and 872.

When the torsion bar 233 is twisted by the steering torque, the first and second yokes 81 and 82 rotate relative to the ring magnet 85 based on the twisting amount, thereby changing a relative positional relationship between the claw portions 812 and 822 of the first and second yokes 81 and 82 and the N poles 851 and the S poles 852 of the ring magnet 85. The change in the positional relationship causes a change in the magnetic field between the tongue portions 862 and 872 based on the twisting amount of the torsion bar 233. The controller 50 can determine the steering torque through calculation based on detection signals from the magnetic sensors 71 and 72.

According to the embodiment described above, the torque detection magnetic sensors 71 and 72 and the rotation angle detection magnetic sensors 73 and 74 are mounted on the circuit board 70 held by the housing 60. Therefore, the number of components and the number of mounting steps can be reduced as compared to the case of the sensor device described in, for example, JP 2013-92461 A where the rotation angle sensor and the torque sensor are provided separately across the shaft. Thus, the cost of the sensor device 6 can be reduced. The sensor device 6 protrudes only in one direction along the radial direction of the pinion shaft 23 with respect to the first tubular portion 41 of the rack housing 4. Therefore, interference with other on-board devices is avoided easily. Thus, the mountability on the vehicle is improved.

In this embodiment, the torque detection magnetic sensors 71 and 72 are mounted between the rotation angle detection magnetic sensors 73 and 74. Therefore, the circuit board 70 can be downsized. That is, the rotation angle detection magnetic sensors 73 and 74 are arranged in alignment with the central parts of the large-diameter gear 76 and the small-diameter gear 77, respectively. Therefore, the distance between the magnetic sensors 73 and 74 cannot be made shorter than a dimension that is the total of the radii of the gear portions 761 and 771 of the large-diameter gear 76 and the small-diameter gear 77. In this embodiment, the circuit board 70 is downsized by arranging the torque detection magnetic sensors 71 and 72 between the two rotation angle detection magnetic sensors 73 and 74 that are spaced away from each other inevitably.

Although the present invention has been described above based on the embodiment, all combinations of the features described in the embodiment are not essential for the solution to the problem of the invention.

The present invention may be modified as appropriate without departing from the spirit of the present invention. For example, the embodiment described above is directed to the exemplary steering system 1 in which the sensor device 6 is applied to the pinion shaft 23 of the steering shaft 2. The present invention is not limited to this case. The sensor device 6 may be applied to the column shaft 21. In this case, the sensor device 6 is arranged on a vehicle cabin side of the dash panel 14, and therefore the lid 9 need not be joined to the second housing 60 in a liquid-tight manner.

The application of the sensor device 6 is not limited to the steering system of the vehicle. The sensor device 6 may be applied to various mounting targets.

What is claimed is:

1. A sensor device whose detection target is a shaft rotatably supported on a support and formed by coupling a pair of rotation shaft members together by a flexible torsion shaft, and which is configured to detect a torque applied to the shaft and a rotation angle of the shaft with respect to the support, the sensor device comprising:
    a torque detecting portion including:
        a pair of soft magnetic bodies having facing portions that face each other along a rotation axis direction of the shaft;
        a torque detection permanent magnet configured to generate a magnetic flux in a magnetic path including the pair of soft magnetic bodies; and
        a torque detection magnetic sensor configured to detect a magnetic field generated between the facing portions,
        the magnetic field detected by the torque detection magnetic sensor changing based on a twisting amount of the torsion shaft;
    a rotation angle detecting portion including:
        a rotating body: (1) configured to rotate by meshing with an external gear configured to rotate together with the shaft, and (2) comprising a large-diameter gear and a small-diameter gear that have different numbers of teeth and mesh with the external gear;
        a rotation angle detection permanent magnet fixed to each of the large-diameter gear and the small-diameter gear; and
        a rotation angle detection magnetic sensor: (1) configured to detect a magnetic field of the rotation angle detection permanent magnet, and (2) comprising two pieces of the rotation angle detection magnetic sensor corresponding to the rotation angle detection permanent magnet of the large-diameter gear and the rotation angle detection permanent magnet of the small-diameter gear, respectively;
        the magnetic field detected by the rotation angle detection magnetic sensor changing based on the rotation angle of the shaft;
    a housing that houses the torque detecting portion and the rotation angle detecting portion; and
    a circuit board held by the housing, wherein
    the torque detection magnetic sensor is: (1) mounted on a first mounting portion formed in the circuit board and (2) mounted on the circuit board between the two pieces of the rotation angle detection magnetic sensor, and
    the rotation angle detection magnetic sensor is mounted on a second mounting portion formed in the circuit board, the rotation angle detection magnetic sensor and the torque detection magnetic sensor are mounted only on one surface of the circuit board.

2. The sensor device according to claim 1, wherein a first housing portion that houses the pair of soft magnetic bodies and the torque detection permanent magnet of the torque detecting portion and a second housing portion that houses the rotating body and the circuit board are integrally formed of a resin in the housing.

3. The sensor device according to claim 2, further comprising a lid that seals an opening formed in the housing, wherein
    an outer face of the lid is inclined with respect to the rotation axis direction.

* * * * *